(12) United States Patent
Chuda et al.

(10) Patent No.: US 9,856,170 B2
(45) Date of Patent: Jan. 2, 2018

(54) GYPSUM PLASTER-BASED MATERIAL CONTAINING CASEIN AND ACTIVATED CARBON

(71) Applicant: SAINT-GOBAIN PLACO, Suresnes (FR)

(72) Inventors: Katarzyna Chuda, Asnieres sur Seine (FR); Caroline Demathieu-Roeltgen, Meaux (FR); Benoit Didier, Liege (BE)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 15/109,497

(22) PCT Filed: Dec. 23, 2014

(86) PCT No.: PCT/FR2014/053526
§ 371 (c)(1),
(2) Date: Jul. 1, 2016

(87) PCT Pub. No.: WO2015/101743
PCT Pub. Date: Jul. 9, 2015

(65) Prior Publication Data
US 2016/0332913 A1    Nov. 17, 2016

(30) Foreign Application Priority Data
Jan. 3, 2014   (FR) ...................................... 14 50028

(51) Int. Cl.
| | | |
|---|---|---|
| C04B 24/24 | (2006.01) | |
| C04B 24/38 | (2006.01) | |
| C04B 28/14 | (2006.01) | |
| C04B 22/02 | (2006.01) | |
| C04B 111/00 | (2006.01) | |

(52) U.S. Cl.
CPC .............. *C04B 24/24* (2013.01); *C04B 22/02* (2013.01); *C04B 24/38* (2013.01); *C04B 28/145* (2013.01); *C04B 2111/00025* (2013.01); *C04B 2111/0062* (2013.01); *Y02W 30/97* (2015.05)

(58) Field of Classification Search
CPC ....... C04B 14/022; C04B 14/20; C04B 14/10; C04B 14/38; C04B 14/06; C04B 14/48; C04B 16/06; C04B 18/24; C04B 20/0048; C04B 20/023; C04B 24/10; C04B 24/14; C04B 24/16; C04B 24/42; C04B 28/145; C04B 38/10; C04B 2103/12; C04B 2103/63; C04B 2103/65; C04B 2111/00025; C04B 2111/0062
See application file for complete search history.

(56) References Cited

U.S. PATENT DOCUMENTS

| | | |
|---|---|---|
| 1,638,001 A | 8/1927 | Brookby |
| 2004/0101695 A1 | 5/2004 | Abe et al. |
| 2011/0113961 A1* | 5/2011 | Sahay-Turner ......... C04B 22/14 95/141 |

FOREIGN PATENT DOCUMENTS

| | | |
|---|---|---|
| DE | 10121419 A1 * | 11/2002 |
| JP | H11-58594 A | 3/1999 |
| JP | 2002-114557 A | 4/2002 |

OTHER PUBLICATIONS

Machine Translation of Japanese Patent Specification No. JP 2002-114557 A (Apr. 2002).*
Derwent-Acc-No. 2014-G51297, abstract of Chinese Patent Specification No. CN 103570273 A (Feb. 2014).*
International Search Report as issued in International Patent Application No. PCT/FR2014/053526, dated Apr. 17, 2015.

* cited by examiner

*Primary Examiner* — Anthony J Green
(74) *Attorney, Agent, or Firm* — Pillsbury Winthrop Shaw Pittman LLP

(57) ABSTRACT

A plaster-based material, in particular a plasterboard intended for the interior fitting of dwellings, contains a mixture of casein and active charcoal. The plaster-based material is used for reducing the amount of volatile organic compounds present in the atmosphere inside dwellings, offices or public buildings.

13 Claims, No Drawings

GYPSUM PLASTER-BASED MATERIAL CONTAINING CASEIN AND ACTIVATED CARBON

CROSS-REFERENCE TO RELATED APPLICATIONS

This application is the U.S. National Stage of International Application Serial No. PCT/FR2014/053526, filed Dec. 23, 2014, which in turn claims priority to French Application No. 1450028, filed Jan. 3, 2014. The contents of all of these applications are incorporated herein by reference in their entirety.

The invention relates to a plaster-based material that is capable of reducing the amount of volatile organic compounds in the ambient air, in particular a plasterboard intended for the interior fitting of dwellings.

Very diverse composite materials are used in the field of construction and of fitment of buildings in general, especially dwellings or offices or public buildings (museums, cinemas, concert halls, etc.). Some of these materials such as sound and/or heat insulators, wood panels, and decorative and furniture elements, use adhesives, paints and varnishes based on resins that contain or release over time volatile organic compounds. These compounds are found in the ambient air and, although the amount thereof appears low they may in the long run trouble or even impair the health of individuals exposed thereto.

In recent years, the proportion of volatile organic compounds in the abovementioned resins has greatly increased due to stricter regulations. However, attempts to replace these resins with others free of volatile organic compounds have been unfruitful since the proposed replacement resins are more expensive and the products obtained have lower performance qualities.

The aim of the present invention is to reduce the content of volatile organic compounds inside buildings, in particular buildings for use as dwellings or offices, so as to improve the quality of the ambient air. The targeted volatile organic compounds are more particularly aldehydes, ketones and aromatic compounds.

To achieve this aim, the present invention proposes a plaster-based material, especially a plasterboard, containing a mixture of casein and of active charcoal.

Another subject of the invention concerns the use of the said plaster-based material for reducing the amount of volatile organic compounds in the interior air of buildings, in particular aldehydes, ketones and aromatic compounds.

In the present patent application, the term "volatile organic compound" denotes a compound containing carbon and at least one of the following elements: hydrogen, halogen, oxygen, sulfur, phosphorus, silicon and nitrogen, with the exception of carbon oxides and mineral carbonates and bicarbonates, which have a vapour pressure at least equal to 0.01 kPa at a temperature of 293.15 K. The volatile organic compounds that are most particularly targeted by the present invention are compounds containing carbon, hydrogen and oxygen.

The casein in accordance with the present invention may originate from milk of any mammal, preferably cow's milk. The casein may be in native form or may have undergone a hydrolysis or enzymatic treatment, especially with rennet enzymes, or a treatment involving an acid or a base (to form in the latter case a caseinate). The casein may be a mixture of several caseins. Preferably, the caseins are native caseins or caseinates, the latter having the advantage of being water-soluble.

The active charcoal in accordance with the present invention has a specific surface area at least equal to 100 $m^2/g$, preferably at least equal to 200 $m^2/g$ and advantageously ranging from 400 to 2500 $m^2/g$. The active charcoal may be a mixture of several active charcoals.

The total amount of casein and of active charcoal to be used generally ranges from 0.01 to 40 parts by weight per 100 parts by weight of plaster, preferably from 0.1 to 20 parts and advantageously from 0.5 to 10 parts.

In the plaster-based material, the casein represents at least 0.1% and preferably 0.1% to 60% by weight of the mixture of casein and active charcoal.

The inventors have demonstrated a synergistic effect between casein and active charcoal. The reduction in the amount of volatile organic compounds obtained for a defined amount of casein and of active charcoal is higher than the reduction obtained for the same amount of casein or of active charcoal. The implementation examples illustrate this synergistic effect.

The plaster-based material may also contain additives that improve the physicochemical properties of the final product and afford good application conditions. The said material may thus comprise the following additives in the following weight proportions, expressed per 100 parts by weight of plaster:

- 0.1 to 15 parts of an adhesion agent whose function is to increase the adhesion of the paper coating to the plaster, for example a starch, especially pretreated with an acid, a dextrin or a vegetable flour, especially wheat or corn flour,
- 0.001 to 10 parts of a setting accelerator, for example hydrated calcium sulfate or potassium sulfate,
- 0.001 to 10 parts of a biocide, for example sodium omadine,
- 0.0001 to 1 part of a foaming agent whose role is to create pores so as to reduce the density of the final product, in particular of plasterboards. An example that may be mentioned is sodium lauryl sulfate,
- 0 to 10 parts of at least one water repellent, for example a siloxane or a polysiloxane,
- 0 to 20 parts of at least one fire retardant, for example vermiculite, silica, especially of micrometric size, a clay or metal fibres,
- 0 to 20 parts of at least one reinforcer, for example polymer fibres, mineral fibres, especially glass fibres, and animal or vegetable fibres.

The manufacture of plaster panels, in particular a plasterboard, is known per se.

Although the invention is more particularly described with regard to plaster panels, it is not limited to this type of material and includes plaster-based materials in any form whatsoever (powder, mortar, mastic).

The plasterboard is formed via a continuous process which consists in mixing powdered calcined gypsum (calcium sulfate hemihydrate) with water to form a paste which is continuously deposited between two sheets of paper. The product formed is pressed to obtain the desired thickness, and it is then transported continuously on a conveyor over a distance allowing the paste to achieve a level of hardening sufficient to be able to cut into boards of given length. The boards are then dried in an oven so as to remove the excess water.

Conventionally, the powder components of the paste comprise calcium sulfate hemihydrate ($CaSO_4 \cdot 0.5\ H_2O$; calcined gypsum) and the optional additives described above. The calcined gypsum undergoes a hydration reaction in the presence of water and becomes transformed into calcium sulfate dihydrate ($CaSO_4.2\ H_2O$: gypsum).

The amount of calcined gypsum used to form the paste varies according to the nature of the panel to be manufactured, generally from 50 to 150 parts by weight per 100 parts by weight of water, preferably from 80 to 120 parts.

The thickness of the board may vary within a wide range, for example from 6 to 25 mm.

The mixture of casein and active charcoal may be introduced into the plasterboard in various ways.

According to a first preferred embodiment, the said mixture is added to the calcined gypsum paste before it is deposited between the sheets of paper.

The addition of casein and active charcoal may take place during the manufacture of paste, for example by simultaneously or successively introducing the calcined gypsum and the abovementioned compounds water, or after the paste has been obtained. The simultaneous addition of the constituents is advantageous since it is easier to perform.

This embodiment affords uniform distribution of the casein and the active charcoal in the mass of the plaster, and thus a constant content throughout the thickness of the plaster.

According to a second embodiment, a layer of low thickness, generally less than 2 mm and preferably less than 1 mm, of a calcined gypsum paste containing the mixture of casein and active charcoal is deposited on the first sheets of paper (lower), followed by the calcined gypsum paste, and finally the second sheets of paper (upper). The application of the paste containing the casein and the active charcoal may take place via any means known to those skilled in the art, for example via the roller coating technique. This manner of proceeding makes it possible to apply the mixture of casein and active charcoal to one face of the plasterboard and to only a part of the thickness.

According to a third embodiment, the casein and the active charcoal are added into or onto the sheet(s) of paper serving as coating. The addition may take place during the manufacture of the paper, for example in the suspension of cellulose fibres, or on at least one face of the sheet of paper, for example by spraying.

The plaster-based material in accordance with the present invention may be in the form of a powder (plaster, mortar), a paste (mastic, pointing material) or a plaster panel. As more particularly regards the plaster panel, it may be a bare board or a board coated on at least one of its faces with a sheet of paper, an acoustic panel comprising perforations, a panel of plaster and mineral wool or wood, or a board reinforced with fibres or a fabric.

The plaster-based material in accordance with the invention may be used on walls, ceilings and floors, especially for coating or pointing plaster or cement panels or, as regards panels, for forming facings, partitions and suspended ceilings.

The use of the plaster-based material inside a building on a place of dwelling, public place or workplace makes it possible to reduce the amount of volatile organic compounds present in the atmosphere, which is consequently found to be made healthier.

The examples that follow illustrate the invention without, however, limiting it.

EXAMPLES 1 TO 3 a) Manufacture of the Plaster-Based Material 950 g of calcium sulfate hemihydrate, 5.2 g of starch, 0.1 g of ground gypsum, the compound(s) below and 850 g of water are placed in a mixer.

Casein (25 g)+active charcoal (25 g): Example 1
Casein (50 g): Example 2 (comparative)
Active charcoal (50 g): Example 3 (comparative)

The casein is sold under the reference C3400 by the company Sigma Aldrich.

The active charcoal is sold under the reference Envirocarb® 207C 4×8 by the company Chemviron Carbon. It has a mass per unit surface area equal to 1100 $m^2/g$ and is ground before being introduced into the mixer.

The mixture is stirred for 60 seconds in order to obtain a paste.

The paste is poured into a brass mould (250 mm×200 mm) lined on its lower face with a sheet of paper, and a second sheets of paper cut to the sizes of the mould is then applied on the paste.

After setting to a solid, the plasterboard is removed from the mould. It is then dried in an oven whose atmosphere is saturated with water under the following conditions: at 180° C. until 80% of the water has been removed, at 100° C. until 95% of the water has been removed and at 40° C. for 24 hours.

The board is wrapped in an airtight bag that is resistant to ultraviolet rays.

b) Capacity for Trapping Volatile Organic Compounds

The measurement of the capacity for trapping volatile organic compounds (acetaldehyde, acetone and benzene) is performed in a gastight test chamber.

The plasterboard (100 mm×20 mm; 125 g) is placed in the test chamber, and chamber is then hermetically closed. A continuous stream of air (relative humidity: 50%) containing 20 ppb of the volatile organic compound to be tested is circulated in the chamber at a rate of 250 ml/min.

The measurement of the amount of volatile organic compound is performed in real-time using an FTICR (Fourier transform ion cyclotron resonance) mass spectrometer equipped with a 1 Tesla magnet. The measurement principle is as follows: a semi-porous flat membrane made of polydimethylsiloxane (PDMS) acting as a barrier between the pressure at the chamber outlet (atmospheric pressure) and the vacuum of the mass spectrometer is used. The pressure difference on either side of the membrane and the semiporous nature of the membrane are such that the volatile organic compounds migrate more rapidly across the membrane than the other molecules contained in the injected air (oxygen, nitrogen, argon, carbon dioxide and water). This results in and enrichment in volatile organic compounds and hence greater sensitivity of detection by the mass spectrometer.

The results given in the table below correspond to a mean value established on a series of three samples of the same plasterboard. The table indicates the percentage reduction in the content of volatile organic compounds below:

|  | Acetaldehyde (%) | Acetone (%) | Benzene (%) |
| --- | --- | --- | --- |
| Ex. 1 | 95 | 92 | 75 |
| Ex. 2 (comp.) | 50 | 28 | 0 |
| Ex. 3 (comp.) | 3 | 40 | 69 |

It is observed that the mixture of casein and active charcoal (Example 1) makes it possible to reduce the content of volatile organic compounds more substantially than casein (Example 2) or active charcoal (Example 3), for an identical amount. The synergistic effect between the casein and the active charcoal is thus demonstrated.

The invention claimed is:

1. A VOC absorbing plaster-based material, comprising:
   a gypsum plaster material;
   a mixture of casein and active charcoal;
   a total amount of casein and active charcoal ranging from 0.01 to 20 parts by weight per 100 parts by weight gypsum plaster and the weight of casein representing from 1.0% to 60% by weight of the mixture of casein and active charcoal.

2. The plaster-based material according to claim 1 further comprising the following additives in the following weight proportions, expressed per 100 parts by weight of plaster:
   0.1 to 15 parts of an adhesion agent,
   0.001 to 10 parts of a setting accelerator,
   0.0001 to 1 part of a foaming agent,
   0 to 10 parts of at least one water repellent,
   0 to 20 parts of at least one fire retardant,
   0 to 20 parts of at least one reinforcer.

3. The plaster-based material according to claim 1, wherein the plaster-based material is in the form of a powder, a paste or a plaster panel.

4. The plaster-based material according to claim 3, wherein the plaster-based material is a plasterboard.

5. The plaster-based material according to claim 1, wherein the total amount of casein and active charcoal ranges from 0.5 to 10 parts by weight per 100 parts by weight of plaster.

6. The plaster-based material according to claim 2, wherein the adhesion agent is a starch, a dextrin or a vegetable flour.

7. The plaster-based material according to claim 6, wherein the starch is pretreated with an acid.

8. The plaster-based material according to claim 2, wherein the setting accelerator is hydrated calcium sulfate or potassium sulfate.

9. The plaster-based material according to claim 2, wherein the foaming agent is sodium lauryl sulfate.

10. The plaster-based material according to claim 2, wherein the at least one water repellent is a siloxane.

11. The plaster-based material according to claim 2, wherein the at least one fire retardant is vermiculite, silica, a clay or metal fibres.

12. The plaster-based material according to claim 2, wherein the at least one reinforcer is polymer fibres, mineral fibres, animal or vegetable fibres.

13. The plaster-based material according to claim 12, wherein the mineral fibres are glass fibres.

* * * * *